March 10, 1953
M. MUSKAT
2,630,968
ELECTRICAL CALCULATOR FOR SOLVING
PHASE EQUILIBRIUM PROBLEMS
Filed Nov. 1, 1948
3 Sheets-Sheet 1
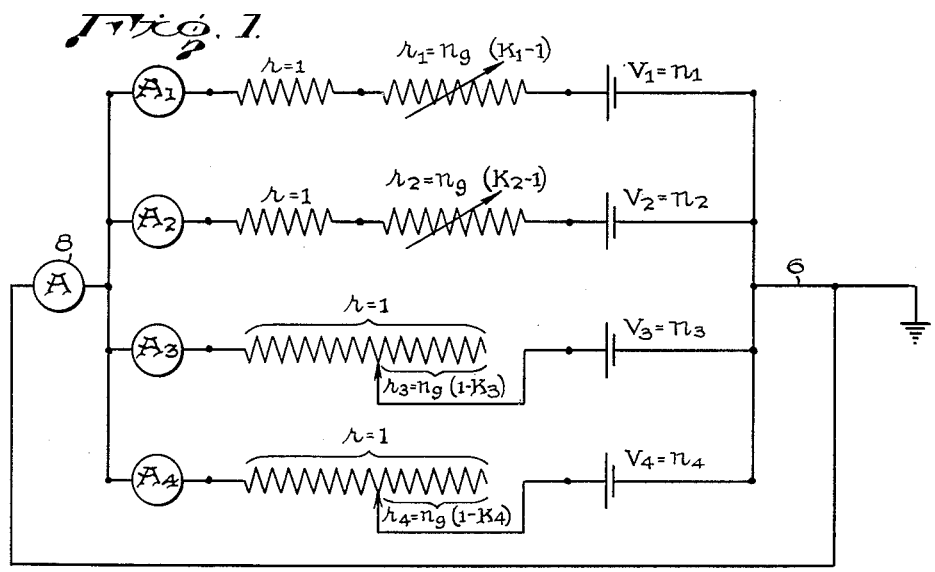
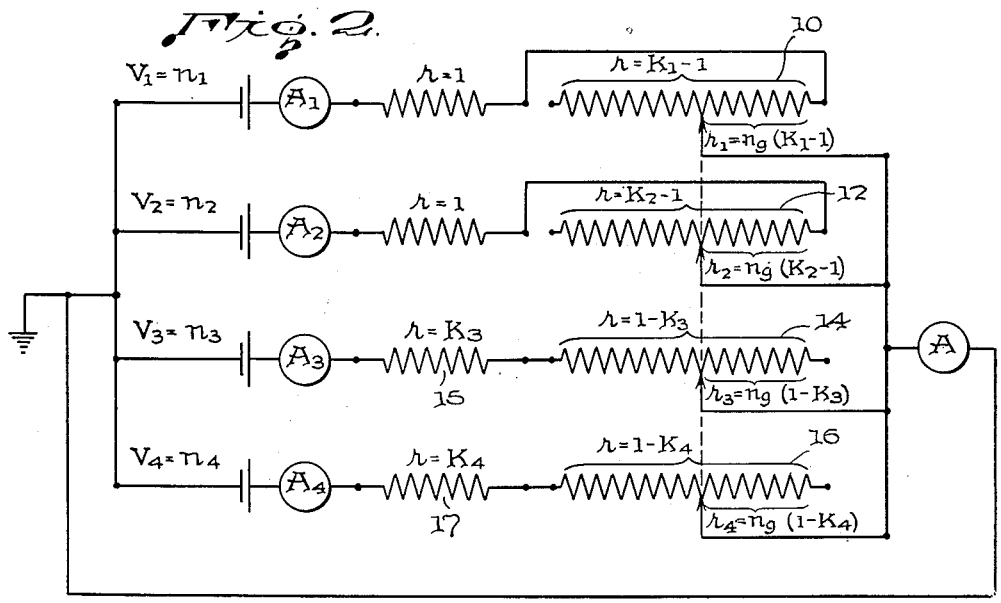
*INVENTOR.*
MORRIS MUSKAT
BY G. M. Houghton
his ATTORNEY March 10, 1953
M. MUSKAT
2,630,968
ELECTRICAL CALCULATOR FOR SOLVING
PHASE EQUILIBRIUM PROBLEMS
Filed Nov. 1, 1948
3 Sheets-Sheet 2
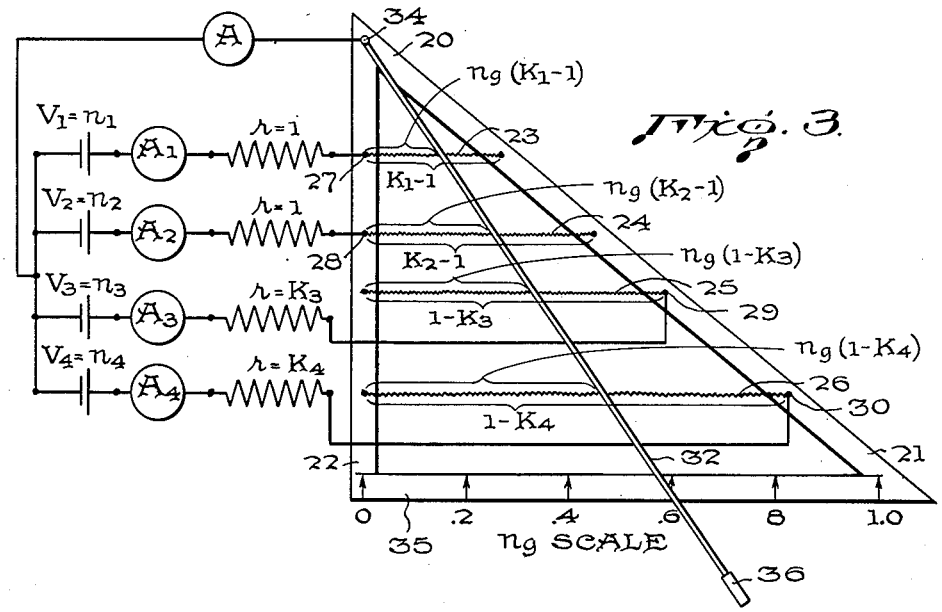
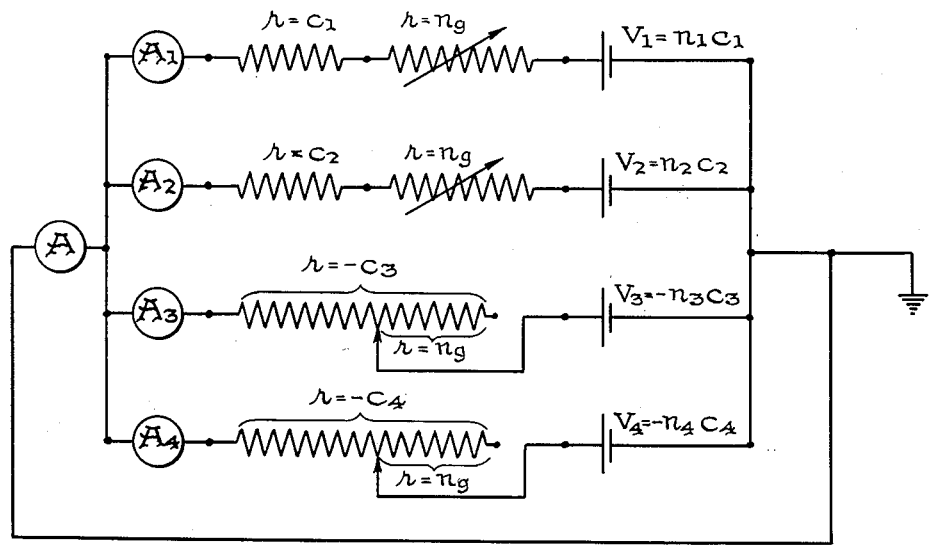
INVENTOR.
MORRIS MUSKAT
BY
his ATTORNEY INVENTOR.
MORRIS MUSKAT
BY G. M. Houghton
his ATTORNEY Patented Mar. 10, 1953

2,630,968

UNITED STATES PATENT OFFICE 2,630,968

ELECTRICAL CALCULATOR FOR SOLVING PHASE EQUILIBRIUM PROBLEMS

Morris Muskat, Oakmont, Pa., assignor to Gulf Research & Development Company, Pittsburgh, Pa., a corporation of Delaware Application November 1, 1948, Serial No. 57,636

9 Claims. (Cl. 235—61)

This invention concerns electrical circuits for solving certain systems of algebraic equations. It relates specifically to an electrical calculator which is useful in solving certain phase-equilibrium problems which are encountered in the production and refining of petroleum.

The phase composition of a system consisting of a mixture of liquid and gaseous hydrocarbons may be expressed in terms of certain quantities which may be defined as follows:

$n_j$=mol fraction concentration of the $j$th component in the composite mixture.

$K_j$=the equilibrium constant for the $j$th component at the pressure and temperature of interest. The equilibrium constant $K_j$ for any component may be defined as the mol fraction of the component in the gas phase divided by the mol fraction of the component in the liquid phase. Its value is ordinarily obtainable from tables of the physical properties of the material.

$n_g$=the mol fraction of the composite system which will be in the gas phase at the given temperature and pressure.

$n_L=1-n_g$=the mol fraction of the composite system which will be in the liquid phase at the given temperature and pressure.

These quantities are related by one of the following two equivalent equations:

$$\sum \frac{n_j}{1+n_g(K_j-1)}=1 \quad (1)$$

$$\sum \frac{n_j K_j}{1+n_g(K_j-1)}=1 \quad (2)$$

The individual terms in the Equation 1 represent the mol fraction $x_j$ of each component in the liquid phase, i. e., $$x_j=\frac{n_j}{1+n_g(K_j-1)}$$

The individual terms in the Equation 2 represent the mol fraction $y_j$ of each component in the gas phase, i. e., $$y_j=\frac{n_j K_j}{1+n_g(K_j-1)}$$

It is also useful to note that from its definition $K_j=y_j/x_j$.

For problems encountered in petroleum production, the composition of the system may be specified in terms of the above quantities for the individual hydrocarbons through the hexanes, the remainder being usually included with and denoted as $C_7+$. For special studies, a distinction may be made between isobutane and normal butane, and also between isopentane and normal pentane. For most purposes, however, the butanes and pentanes may be respectively grouped together, so that there are 7 terms in the system of the above equations, that is, $j=1, 2, \ldots 7$. In certain refining problems, terms corresponding to the unsaturated hydrocarbons and other compounds may also be included, raising the number of terms to something larger than 7. My invention will be described for a case having four components but this is by way of example only and it may be extended to any number of components desired.

In the analysis of a problem of the type which my invention is useful in solving, the unknown quantity is either $n_g$, i. e., the mol fraction of the system in the gas phase, or its supplementary equivalent $n_L=1-n_g$ which is the mol fraction of the system in the liquid phase. The values of $n_j$ are known from the chemical analysis of the composite mixture, and the values of $K_j$ are known from the properties of the individual components at the known conditions of temperature and pressure. Thus all of the necessary factors for determining $n_g$ or $n_L$ are known and the Equations 1 or 2 are theoretically solvable.

If there are N components in the system, the Equation 1 is to be solved is an Nth degree equation in the unknown $n_g$. In the past this equation has been solved by trial and error procedures which involve laborious numerical calculation. My invention affords an apparatus by means of which the equation may be solved very quickly, and furthermore it provides a means for observing directly and immediately the effect of any change in any one of the parameters, e. g., the concentrations $n_j$ or the equilibrium constants $K_j$.

My invention makes use of an electrical circuit which is analogous to the Equation 1 or an equivalent equation, and by means of this electrical circuit the solution may be rapidly obtained by making an electrical measurement in said circuit. The circuits of my invention are so arranged that it produces the additive result of Equation 1 in terms of simple electric circuit parameters which are made equivalent to the terms of the Equation 1 or an equivalent thereof.

It is accordingly an object of my invention to provide an apparatus for quickly solving phase-equilibrium problems.

Another object of my invention is to provide an electrical apparatus which is an electrical analogue of a phase-equilibrium problem.

A still further object of my invention is to provide an electrical computing device by means of which phase-equilibrium problems may be solved without laborious mathematical computation.

A still further object of my invention is to provide an electrical apparatus for solving phase-equilibrium problems and which will permit the operator to quickly and without laborious computation determine the effect of changes in any parameter of the problem.

A still further object of my invention is to provide an electrical apparatus for solving equations of the type $$\sum_{j=1}^{j=n} \frac{p_j}{q_j + r_j x} = z$$

in which $x$ is unknown and the other quantities are all known.

These and other objects are accomplished by the apparatus disclosed in the following specification of which the accompanying drawings form a part and in which:

Figure 1 is a schematic wiring diagram of an embodiment of my invention;

Figure 2 is a wiring diagram showing one way in which the scheme of Figure 1 may be carried out;

Figure 3 illustrates a device for varying a number of different resistances by proportionate amounts and which is useful in the operation of Figures 1 and 2;

Figure 4 is a schematic wiring diagram of another embodiment of my invention;

Figure 5:
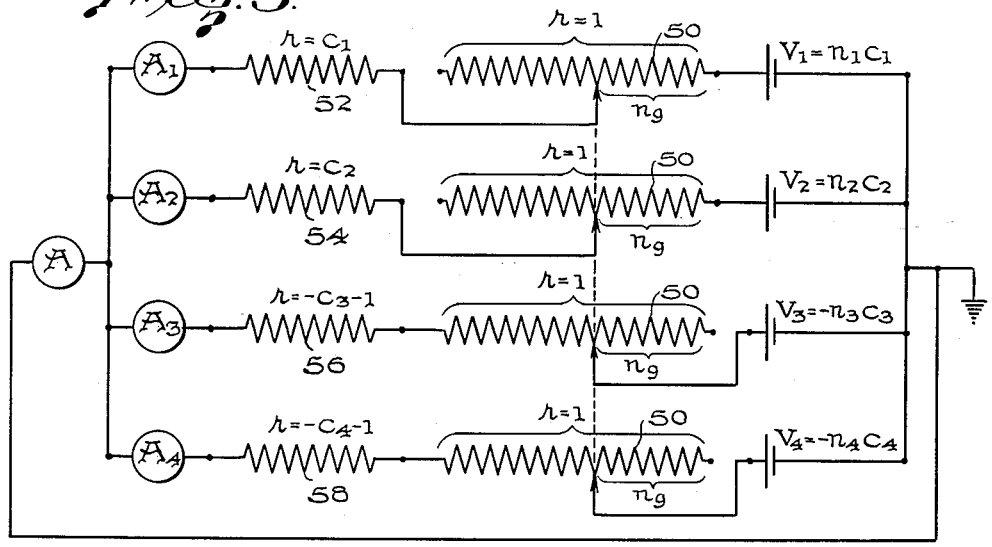
Figure 5 is a wiring diagram showing how the scheme of Figure 4 may be carried out.

The circuit is a simple series and parallel network of resistance elements, each parallel branch representing one component of the mixture, and in one embodiment of my invention the circuit is arranged so that the total current is given by $$\Sigma V_j / R_j$$

which is made equal to 1 as is the right-hand side of Equation 1.

Thus the analogous phase-equilibrium and electric-circuit equations are:

$$\sum \frac{n_j}{1 + n_g(K_j - 1)} = 1$$

and $$\sum \frac{V_j}{R_j} = 1$$

In the electrical circuit of my invention the voltages $V_j$ are set equal to the numerators, i. e., the $n_j$'s, and the branch resistors $R_j$ are set equal to the denominators, i. e., $[1 + n_g(K_j - 1)]$. The circuit is set up in such a way that the quantities in Equation 1 are represented by electrical elements and the solution of the equation may be quickly found by proper adjustment of the electrical elements and from a simple measurement of the proper parameter of the circuit as will be pointed out. Specifically for Equation 1 the sought-for value of $n_g$ is that which will make the total current in the circuit equal to 1.

It is to be noted that the Equation 1 may be multiplied through or divided through by a constant without changing its significance. Such a constant may be termed a scale factor and is useful to bring the various electrical values into the range of readily obtainable components. It is apparent that in the event a scale factor different from unity is used, some of the electrical components have values which are proportional to, rather than equal to, the corresponding quantity in Equation 1. For simplicity in describing my invention it will be assumed that the scale factor is unity, but it is to be understood that this is not a limitation and that my invention is equally useful when another scale factor is mathematically properly applied. A similar simplification will also be made in describing other embodiments of my invention. Therefore, it is to be understood that where electrical quantities are stated to be equal to quantities in the equation, such statement implies the use of a properly applied scale factor.

Figure 1 shows a schematic wiring diagram of the circuit used in one embodiment of my invention. A number of branches shown by the horizontal rows are connected in parallel. Each branch has a battery or power supply whose voltage represents the numerator of a term of Equation 1 and resistors which taken together represent the denominator of the same term of Equation 1. Figure 1 shows only four branches simulating a problem having four components but it may be extended to any number of components as desired. One end of each parallel branch goes to a common terminal such as at 6 which may be grounded, and the other end connects into a common current meter such as at 8 and is then returned to the common terminal or ground. Each branch may also contain a separate current meter as shown in Figure 1.

The devices indicated by $V_1$, $V_2$, ... $V_n$ supply fixed voltages and may be any suitable source of electric power, for example batteries or generators. It is advantageous for these power sources to have good voltage regulation so that their respective voltage $V_j$ does not change appreciably with load variations. The devices $V_1$, $V_2$, ... $V_n$, i. e. the $V_j$'s, may be appropriate electronic power supplies of which one terminal may be grounded. Alternatively, battery-energized potentiometers of conventional type may be used for the $V_j$'s. The voltages $V_1$, $V_2$, $V_3$, $V_4$, i. e. the $V_j$'s, are adjusted to be equal to the respective known values of the $n_1$, $n_2$, $n_3$, $n_4$, i. e. the $n_j$'s, of the terms of Equation 1. All of the voltage supplies are connected in the same direction as shown in Figure 1.

In all hydrocarbon systems coexisting in two phases the $K_j$'s will fall into two sets, in one of which $K_j < 1$ and in the other of which $K_j > 1$. Equation 1 will therefore contain two types of terms depending on whether $K_j$ is greater or less than 1. The quantities $K_j$ and $n_g$ are of course positive. We may conveniently break up Equation 1 into two groups of terms as follows:

$$\sum \frac{n_j}{1 + n_g(K_j - 1)} + \sum \frac{n_j}{1 - n_g(1 - K_j)} = 1 \quad (3)$$

In Equation 3 the first summation contains terms in which $K_j$ is greater than 1 and the second summation contains terms in which $K_j$ is less than 1. It should be noted that since $n_g$ is positive and less than one that the denominator of both types of terms is always positive. Since $K_j$ is known for each component, $(K_j - 1)$ is known for each term of the first summation and $(1 - K_j)$ is known for each term of the second summation.

The denominator of each term of the first summation is set up as shown in the upper two branches of Figure 1. In each of these there is fixed a resistor $r$ equal to 1 and in series with it there is a variable resistor $r_j$ which is to be made equal to the quantity $n_g(K_j - 1)$. The resistors $r_1$ and $r_2$ (also others pertaining to terms of the first summation in a general problem) are then all varied uniformly by the common factor $n_g$ in a manner to be shown later.

The denominator of each term of the second summation is set up as shown in the lower two branches of Figure 1. Each branch must evidently have a total resistance of 1 from which is subtracted an amount equal to $n_g(1-K_j)$. This is indicated in Figure 1 by the over-all resistance connected to the lower branches being 1 and having subtracted therefrom, respectively, an amount equal to $n_g(1-K_j)$. The resistances $r_3$ and $r_4$ (also others pertaining to terms of the second summation in a general problem) are then varied uniformly by the common factor $n_g$ in a manner to be shown later.

It is evident that if all of the resistors $r_1$, $r_2$, $r_3$, $r_4$ of all the branches are varied by simultaneously adjusting them in equal ratios ($n_g$) until the total current indicated by ammeter is equal to 1, the value of the resistance ratio $n_g$ will thereupon represent the desired solution of Equation 3. While in principle, Equation 1 or 3 will have several mathematical solutions, the physically significant solution must be real and lies in the range of $0 \leq n_g \leq 1$.

Figure 2 shows one way in which the circuit of Figure 1 may actually be set up. The circuit is entirely similar to Figure 1 except for the arrangement of components. The upper two branches are illustrative of branches which represent terms of the first summation in which $K_j$ is greater than 1. The resistances $r_1$ and $r_2$ are fractions of the resistors 10 and 12 respectively, the fraction in each case being the same. The lower two branches are illustrative of branches which represent terms of the second summation in which $K_j$ is less than 1. The total available resistance in each of these branches must be 1. Therefore, since the resistors 14 and 16 are respectively equal to $(1-K_j)$, the resistances 15 and 17 must respectively be $1-(1-K_j)$ or simply $K_j$. The variable parts of resistors 14 and 16, namely $r_3$ and $r_4$ are fractions of the resistors 14 and 16, the fraction in each case being the same and being furthermore the same as the fractions of resistors 10 and 12 which make up $r_1$ and $r_2$. In order to obtain the solution $n_g$ it is necessary in Figure 2 to vary all the resistors 10, 12, 14, 16 in such a manner that the contactor in each case taps off the same fraction of each resistor. This may be done by means of a device such as shown in Figure 3.

In order to vary the resistors 10, 12, 14 and 16 of Figure 2 in the common ratio $n_g$, reference may be made to Figure 3. As in Figures 1 and 2, the upper two branches of Figure 3 are illustrative of terms of Equation 3 for which $K_j$ is greater than one and the lower two branches are illustrative of terms of Equation 3 for which $K_j$ is less than one as previously explained. A triangular frame 20 having its apex at 34 and base at 35 is made of insulating material and has stretched across two of its sides, 21 and 22, wire resistors 23, 24, 25 and 26. The length of each wire may be made respectively equal to the quantity $(K_j-1)$ or $(1-K_j)$ which it represents. Alternatively, the wires need not be straight wires, but may be helically coiled in the manner of resistance elements and arranged so that they have a uniform resistance variation along their length with the total resistance of each wire made respectively equal to the value $(K_j-1)$ or $(1-K_j)$ which it represents. The frame 20 is made of insulating material and the resistance elements are stretched on the frame in parallel relation and are also parallel to the base 35. One end of each wire, such as for example points 27, 28 of wires 23, 24 and points 29, 30 of wires 25, 26, is connected to the other elements of the respective series circuit, i. e. the respective resistors $r=1$ or $r=K_j$ and voltage supplies $V_j$ each respectively supplying a voltage equal to $n_j$ as shown in Figure 3. An ammeter such as $A_1$, $A_2$, $A_3$, $A_4$ may also be included in series with each branch. A swinging bar 32 made of conducting material is pivoted about the apex 34 of the frame 20. The swinging bar 32 contacts on its lower edge each one of the respective wires 23, 24, 25, 26. The wires are thus connected together since they are contacted by the bar 32 and are connected to meter A of Figure 3 as shown. The circuit is thus equivalent to that of Figures 1 and 2. A scale on the base 35 of the triangular frame may be divided into fractional units representing $n_g$. As Figure 3 is drawn $n_g$ is zero in line with the left-hand end of the wires and 1.0 in line with the right-hand end of the wires. A handle 36 may be provided for the swinging bar 32. It is apparent from the geometrical theorem of proportionate sides, that by swinging the bar 32 the resistance wires 23, 24, 25, 26 are contacted at a point so that an equal fraction of each wire is in circuit or out of circuit as required.

The operation of Figure 3 is as follows: The voltage supplies $V_1$, $V_2$, $V_3$, $V_4$, i. e. the $V_j$'s, are adjusted so that they supply voltages equal to the values of the respective $n_j$'s of Equation 3. Resistors 23, 24, 25, etc., whose resistances are equal to the values of $(K_j-1)$ and $(1-K_j)$ respectively as previously explained, are mounted on the frame 20, and the respective voltage supplies and respective resistors $r=1$ and $r=K_j$ and also ammeters $A_1$, $A_2$, $A_3$, etc. connected thereto respectively. The circuit is completed through the meter A as shown in Figure 3. The swinging arm 32 is now swung about pivot 34 into angular position such that a current of one unit is shown on the ammeter A, whereupon the value of $n_g$ may be read from the scale 35. Geometrical frames other than the triangular one shown in Figure 3 may be used, such as, for example, a sector of a circle with the wires 23, 24, 25 laid along concentric arcs at such a radial distance from point 34 as to have total lengths proportional to the $(K_j-1)$'s and the $(1-K_j)$'s respectively.

The respective ammeters $A_1$, $A_2$, $A_3$, etc., of Figures 1–3, indicate the individual current in each branch. These currents represent terms of Equation 1, which represent for the respective components the mol fraction of that component which is in the liquid phase, namely $$x_i = \frac{n_j}{1+n_g(K_j-1)}$$

A second embodiment of my invention is analogous to a somewhat different form of Equation 1 which may be derived therefrom as follows. Considering again Equation 1, namely $$\sum \frac{n_j}{1+n_g(K_j-1)} = 1 \qquad (1)$$

we may let $$c_j = \frac{1}{K_j-1}$$

Since the $K_j$'s are known, the quantities $c_j$ are easily computed and are known.

Then if one multiplies both the numerator and the denominator of each term on the left-hand side of Equation 1 by $c_j$ one obtains $$\sum \frac{n_j c_j}{c_j + n_g} = 1 \quad (4)$$

An analogous circuit, similar to Figure 1, may be set up for solving the equation in this form. As before, the $n_j$'s are known and the $c_j$'s are known (being easily computed from the known $K_j$'s), so the quantities $n_j c_j$ are known. The value of $n_g$ is sought.

In all hydrocarbon systems coexisting in two phases the $K_j$'s will fall into two sets, in one of which the $K_j < 1$, and in the other $K_j > 1$. The Equation 4 can then be broken up into two summations as follows:

$$\sum \frac{n_j c_j}{c_j + n_g} + \sum \frac{-n_j c_j}{-c_j - n_g} = 1 \quad (5)$$

where in the first summation the $K_j$'s $< 1$ so that the $c_j$'s are positive, and where in the second summation the $K_j$'s $> 1$ so that the $c_j$'s are negative. The apparent negative character of $n_g$ in the terms of the second summation is readily taken care of since the term $(-c_j)$ is positive and $n_g$ may be subtracted from it in the corresponding resistance branch.

A circuit which is similar to Figure 1 but analogous to Equation 5, is shown in Figure 4. There are two types of parallel branches corresponding to the two types of terms in Equation 5. Only two branches of each type are illustrated but the number may be increased or decreased to fit the demands of the particular problem to be solved. The voltage supplies $V_1, V_2, \ldots V_n$ are adjusted to be analogous to the quantities $n_j c_j$ of the first summation and $-n_j c_j$ of the second summation. It is to be noted that these are all of the same sign, because in the second summation terms the $c_j$'s are themselves negative.

The branches which represent the first summation of Equation 5 have two series resistances respectively equal to $c_j$ and $n_g$, so that these branches (shown as the first two of Figure 4) each have a total resistance of $c_j + n_g$, and the current through each of these branches is therefore $$\frac{n_j c_j}{c_j + n_g}$$

An ammeter is shown in each branch to indicate the current ($A_1, A_2$) whose significance will be mentioned later.

The branches which represent the second summation of Equation 5 have only one resistance equal to $-c_j - n_g$, the term $(-c_j)$ being positive and having $n_g$ subtracted from it. These branches may also have current meters ($A_3, A_4$) as shown.

The actual circuit is set up as shown in Figure 5. Since $n_g$ may vary from 0 to 1 the entire range of the calibrated variable resistors indicated by numeral 50 is 0 to 1. These variable resistors may be ganged or geared to a single adjusting shaft and all adjusted simultaneously by means of a single adjusting knob which indicates the resistance setting. The voltage supplies $V_1, V_2, \ldots V_n$ are adjusted to give voltages as described above. The positive $c_j$'s are each set up by resistors in series with their respective resistor 50, as shown at 52 and 54. The negative $c_j$'s are each set up so that the series resistor as shown at 56 and 58 have a value equal to $|c_j|$ minus the total range of resistor 50, and they are connected, as shown in Figure 5, to the high end of the respective resistor 50.

When the circuit is thus set up and completed through ammeter A as shown in Figure 5 it is merely necessary to move the common adjusting knob on the gang of resistors 50 until the ammeter A reads 1 whereupon the sought-for solution $n_g$ is found indicated on the dial of calibrated resistors 50.

The ammeters $A_1, A_2, A_3, A_4$ indicate the current in each of the respective branches. These currents represent the terms of Equations 4 or 5 and these are for each respective component the mol fraction which is in the liquid phase, namely $$x_j = \frac{n_j c_j}{c_j + n_g} = \frac{n_j}{1 + n_g(K_j - 1)}$$

A third embodiment of my invention is analogous to a somewhat different form of Equations 1 and 4 as follows:

If we subtract Equation 1 from Equation 2 and multiply numerator and denominator by $$c_j = \frac{1}{(K_j - 1)}$$

then one obtains an equation in the form $$\sum \frac{n_j}{c_j + n_g} = 0 \quad (6)$$

This equation may be set up by an analogous circuit which is similar to Figure 5. A separation of terms according to whether the $c_j$ is positive or negative must be made. Thus the equation becomes $$\sum \frac{n_j}{c_j + n_g} + \sum \frac{-n_j}{-c_j - n_g} = 0 \quad (7)$$

Figure 6:
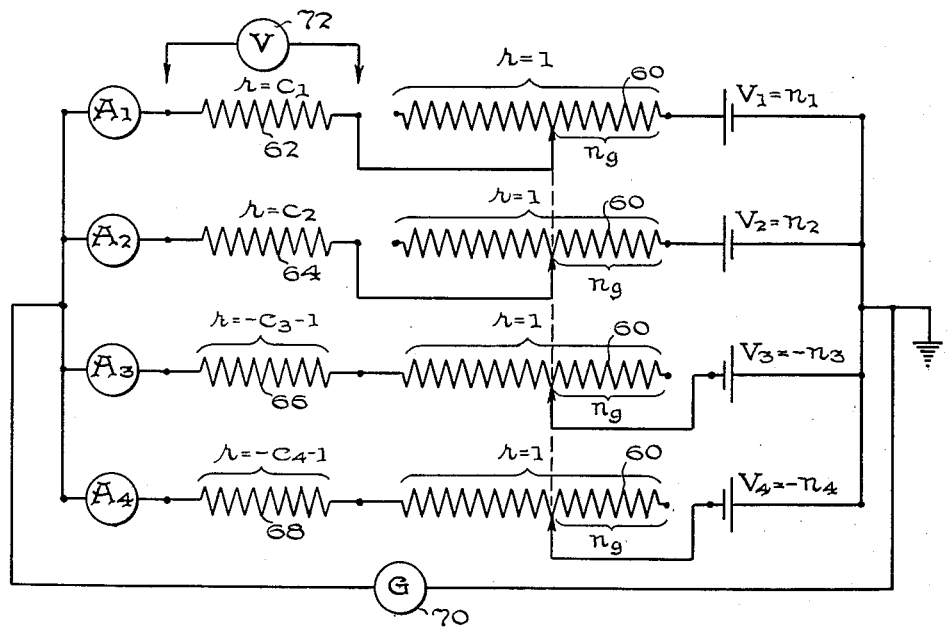
Figure 6 is a wiring diagram showing still another embodiment of my invention.

The circuit which is analogous to Equation 7 is shown in Figure 6. The resistances are set up as explained in discussing Figure 5. Two types of parallel branches are again necessary as explained above to take care of the terms in which $c_j$ is respectively positive and negative. Thus the first summation in Equation 7 takes care of the terms in which $c_j$ is positive and the second summation takes care of the terms in which $c_j$ is negative. It is to be noted that in the branches representing those terms for which $c_j$ is negative, the corresponding power-supply voltage must be reversed in sign and have a value equal to $|n_j|$ in order to give an effect analogous to the numerator of the terms in the second summation, namely $(-n_j)$. The calibrated variable resistors 60, each of which has a total resistance of 1, are ganged on a common shaft so that they are all varied simultaneously in the same amount.

When Figure 6 is thus set up and the resistors 60 are adjusted so that the galvanometer 70 reads zero, then the solution ($n_g$) of Equation 7 may be read from the setting of the common adjustment of calibrated resistors 60. This embodiment of my invention for solving for $n_g$ has the advantage of being easily adapted to automatic operation in which the gang of variable resistors 60 may be automatically motor-driven in response to the unbalance signal in the galvanometer 70 so that the system seeks the null point and the solution to the equation. Such an arrangement is convenient when observing the effect on the phase equilibrium of changing one or more of the parameters, such as one or more of the $c_j$'s or one or more of the $n_j$'s.

The ammeters in the several branches of Figure 6 will indicate the current in each branch. When the galvanometer 70 reads zero these currents represent the respective quantities $n_j/(c_j+n_g)$. These quantities represent the difference between the mol fraction, of the $j$th component, in the gas phase and in the liquid phase, i. e., $y_j-x_j$.

In the embodiment of Figure 6 means may be provided for measuring the voltage across the respective resistors 62, 64, 66, 68. This may be done by means of a voltmeter 72 whose leads may be connected across any resistor or by having a series of voltmeters (not shown) each one of which is connected across one of the resistors. The individual values of $x_j$ and $y_j$ may be determined from the voltmeter readings which are taken at the condition when the galvanometer 70 reads zero as follows.

Considering the branches representing terms in which $c_j$ is positive, the current is given by $n_j/(c_j+n_g)$. The voltage drop across resistors 62, 64 is the current times the resistance, namely $c_jn_j/(c_j+n_g)$. Since $c_j=1/(K_j-1)$, this expression for the voltage drop reduces to $$\frac{n_j}{1+n_g(K_j-1)}$$

which is the value of $x_j$ as may be seen from Equation 1. Thus, for those branches of Figure 6 representing terms in which $c_j$ is positive, one may determine the respective $x_j$'s by measuring (at the condition when galvanometer 70 reads zero) the voltages across the corresponding resistors 62, 64 by means of voltmeter 72. Considering the branches representing terms in which $c_j$ is negative, it is apparent that because the total resistance of resistor 60 is 1, the value of the resistors 66, 68 is equal to $(-c_j-1)$. The current through each of these branches equals the voltage divided by the total resistance in the circuit, namely $V_j/(-c_j-n_g)$ which is equal to $n_j/(-c_j-n_g)$. The resulting voltage drop across the respective resistors 66, 68 is equal to this current times the resistance, namely $$n_j(-c_j-1)/(-c_j-n_g)$$

Again since $c_j=1/(K_j-1)$ the foregoing expression for these voltages may be transformed into the expression $$\frac{n_jK_j}{1+n_g(K_j-1)}$$

which is the value of $y_j$ as may be seen from Equation 2. Thus for those branches of Figure 6 representing terms in which $c_j$ is negative, one may determine the respective $y_j$'s by measuring (at the condition when galvanometer 70 reads zero) the voltages across the corresponding resistors 66, 68. Therefore when galvanometer 70 reads zero in Figure 6, the voltmeter 72 when connected across the resistors (e. g., 62, 64) in those branches for which $c_j$ is positive indicates the respective values of the $x_j$'s, while the voltmeter 72 when connected across the resistors (e. g., 66, 68) in those branches for which $c_j$ is negative indicates the respective values of the $y_j$'s. In each case the mol fraction in the other phase may be computed from the relation $K_j=y_j/x_j$.

In the above-described embodiments of my invention shown in Figures 1 to 5, the summation current is referred to as adjusted to unity in analogy with the right-hand member of Equations 1 to 5. However, the equations may be multiplied through by a constant without changing their significance, and such a constant functions merely as a scale factor used in order to bring the various parameters into the range of easily obtainable electrical quantities. If such a scale factor is used, the right-hand member of the equations becomes unity multiplied by the scale factor used. The scale factor may be greater than 1 or may be less than 1, i. e. a fraction, and is, of course, to be algebraically properly included in the terms on the left-hand side of the equations. As both the equations and the circuits are entirely equivalent, whether a scale factor is used in them or not, it is to be understood that such equivalence is included within the meaning of the appended claims.

While I have described and illustrated my invention as employing D.-C. E. M. F.'s and simple resistance elements, it is apparent to those familiar with electric circuits that also capacitance or inductance circuit elements and A.-C. voltage supplies may be employed.

A particularly valuable feature of my invention is that it will permit a very rapid determination of the effect of composition on the phase equilibrium. By previous methods this would involve repetitive calculations for each minor change. By the use of a circuit such as illustrated by Figure 6, it is merely necessary to change the voltage adjustment for the power supply corresponding to the $n_j$ whose effect is to be observed, and observe the corresponding variation in the $n_g$ resistor required to restore the null reading in the galvanometer 70. The resulting changes in the individual phase composition can then also be readily observed by reading a voltmeter 72 connected across the appropriate resistor 62, 64, 66 or 68. The sensitivity of the $n_g$ solutions to the absolute values of the equilibrium constants $K_j$ may also be easily investigated by the circuits of my invention.

While I have herein described my invention as applied to the solution of phase-equilibrium problems, it is applicable also to the solution of any problem involving an equation of the form $$\sum_{j=1}^{j=n}\frac{p_j}{q_j+r_jx}=z \qquad (8)$$

where the $p_j$'s, the $q_j$'s, the $r_j$'s and $z$ are known or easily calculated from known quantities, and $x$ is to be determined. The solution of such an equation is a laborious computation, but it may be easily and quickly obtained with much reduced chance of error by employing my invention in the form of Figures 1 to 3. In the general form of Equation 8 the solution $x$ may not necessarily be less than unity as it is in the phase-equilibrium problem herein described, but this may be taken care of by means of a scale factor. Thus by dividing both numerator and denominator of a term by the estimated maximum value of $x$, any term may be transformed into one in which the $x$ will be fractional, i. e. less than unity. Furthermore, an equation such as (8) may be transformed into the form $$\sum_{j=1}^{j=n}\frac{p_j'}{q_j'+x}=z \qquad (9)$$

(by dividing both numerator and denominator of the left-hand terms by $r_j$) and in this form the solution may be quickly found by employing my invention as embodied in the circuits of Figures 4 to 6. While in the phase-equilibrium problem herein described the variable resistors which represent $n_g$ (i. e. $x$) have a maximum value of unity, they may be increased to any required value for solving the more general Equation 9. In the event that any of the quantities in Equations 8 and 9 are inherently negative, such quantities may be given their proper algebraic relationship in the circuits as herein disclosed.

What I claim as my invention is:

1. An electrical calculating circuit for solving an equation of the type $$\sum_{j=1}^{j=n} \frac{p_j}{q_j+r_j x} = z$$

where the $p_j$'s, $q_j$'s, $r_j$'s and $z$ are known, $n$ is greater than unity, and $x$ is to be found, comprising parallel circuit branches each branch representing a term of the summation and each branch having serially connected a source of electric energy whose strength is made equal to the quantity $p_j$ of the represented term and an impedance whose value is made equal to the quantity $q_j$ of the represented term plus a variable portion of an impedance whose total impedance is made equal to the quantity $r_j$ of the represented term, means for simultaneously adjusting the variable portion of said $r_j$ impedances to an equal known fraction thereof whereby the respective variable portions of said $r_j$ impedances represent the respective terms $r_j x$, an electrical connection from one side of said parallel circuit to the other side of said parallel circuit, and means for indicating when the current in said electrical connection representing the sum total current of all of said parallel branches is equal to $z$, whereupon the solution $x$ is given by the known fraction of said $r_j$ impedances in circuit.

2. An electrical calculating circuit for solving a multicomponent phase-equilibrium problem comprising two parallel sets of parallel branches each branch representing a significant component of the system to be solved and one set of branches representative of those components for which $K_j$ is greater than unity and the other set representative of those components for which $K_j$ is less than unity and where $K_j$ equals the equilibrium constant for the represented component at the temperature and pressure of interest and $n_j$ equals the mol fraction concentration of the represented component in the system, each branch of said first set having serially connected a source of electric energy whose strength is made equal to the quantity $n_j$ and an impedance equal to unity plus a variable portion of an impedance whose total impedance is made equal to the quantity $(K_j-1)$, each branch of said second set having serially connected a source of electric energy whose strength is made equal to $n_j$ and an impedance made equal to the quantity $K_j$ plus a variable portion of an impedance whose total impedance is made equal to the quantity $(1-K_j)$, means for simultaneously adjusting the variable portion of said impedances of the first set so that the same known fraction thereof is in circuit and simultaneously also adjusting the variable portion of said impedances of the second set so that the same known fraction thereof is out of circuit, an electrical connection from one side of said parallel circuit to the other side of said parallel circuit, and means for indicating in said electrical connection the sum total of the electric currents of all said parallel branches, whereupon the known fraction of said variable impedances in circuit of the first set of branches or the known fraction of said variable impedances out of circuit of the second set of branches when said total current is unity represents the mol fraction of the system which will be in the gas phase at the temperature and pressure of interest.

3. An electrical calculating circuit for solving an equation of the type $$\sum_{j=1}^{j=n} \frac{p_j}{q_j+x} = z$$

where the $p_j$'s, $q_j$'s and $z$ are known, $n$ is greater than unity, and $x$ is to be found, comprising parallel circuit branches each branch representing a term of the summation and each branch having serially connected a source of electric energy whose strength is made equal to the quantity $p_j$ of the represented term and an impedance whose value is made equal to the quantity $q_j$ of the represented term plus a calibrated variable impedance, means for simultaneously adjusting said variable impedances to an equal known value representative of $x$, an electrical connection from one side of said parallel circuit to the other side of said parallel circuit, and means for indicating in said electrical connection when the sum total current of all of said parallel branches is equal to $z$, whereupon the solution $x$ is given by the known value of said last-named impedances in circuit.

4. An electrical calculating circuit for solving a multicomponent phase-equilibrium problem comprising two parallel sets of parallel branches each branch representing a significant component of the system to be solved and one set of branches being representative of those components for which the quantity $c_j=1/(K_j-1)$ is positive and the other set representative of those components for which $c_j$ is negative and where $K_j$ equals the equilibrium constant for the represented component at the temperature and pressure of interest and $n_j$ equals the mol fraction concentration of the represented component in the system, each branch of said first set having serially connected a source of electric energy whose strength is made equal to the quantity $(c_j n_j)$ and an impedance whose value is made equal to $c_j$ plus a variable portion of an impedance whose total impedance is unity, each branch of said second set having serially connected a source of electric energy whose strength is made equal to the quantity $(-c_j n_j)$ and an impedance whose value is made equal to the quantity $(-c_j-1)$ plus a variable portion of an impedance whose total impedance is unity, means for simultaneously adjusting the variable portion of said impedances of the first set so that the same known fraction thereof is in circuit and simultaneously also adjusting the variable portion of said impedances of the second set so that the same known fraction thereof is out of circuit, an electrical connection from one side of said parallel circuit to the other side of said parallel circuit, and means for indicating in said electrical connection the sum total of the electric currents of all said parallel branches, whereupon the known fraction of said variable impedances in circuit of the first set of branches or the known fraction of said variable impedances out of circuit of the second set of branches when said total current is unity represents the mol fraction of the system which will be in the gas phase at the temperature and pressure of interest.

5. An electrical calculating circuit for solving a multicomponent phase-equilibrium problem comprising two parallel sets of parallel branches each branch representing a significant component of the system to be solved and one set of branches being representative of those components for which the quantity $c_j=1/(K_j-1)$ is positive and the other set representative of those components for which $c_j$ is negative and where $K_j$ equals the equilibrium constant for the represented component at the temperature and pressure of interest and $n_j$ equals the mol fraction concentration of the represented component in the system, each branch of said first set having serially connected a source of electric energy whose strength is made equal to the quantity $n_j$ and an impedance whose value is made equal to the quantity $c_j$ plus a variable portion of an impedance whose total impedance is unity, each branch of said second set having serially connected a source of electric energy whose strength is made equal to the quantity $n_j$ and connected in its branch in negative sense and an impedance whose value is made equal to the quantity $(-c_j-1)$ plus a variable portion of an impedance whose total impedance is unity, means for simultaneously adjusting the variable portion of said impedances of the first set so that the same known fraction thereof is in circuit and simultaneously also adjusting the variable portion of said impedances of the second set so that the same known fraction thereof is out of circuit, an electrical connection from one side of said parallel circuit to the other side of said parallel circuit, and means for indicating in said electrical connection the sum total of the electric currents of all said parallel branches, whereupon the known fraction of said variable impedances in circuit of the first set of branches or the known fraction of said impedances out of circuit of said second set of branches when said total current is zero represents the mol fraction of the system which will be in the gas phase at the temperature and pressure of interest.

6. The apparatus of claim 2 including means for measuring the electric current in at least one of said parallel branches, whereupon when the total current is unity the current in said branch represents the mol fraction of the represented component in the liquid phase.

7. The apparatus of claim 4 including means for measuring the electric current in at least one of said parallel branches, whereupon when the total current is unity the current in said branch represents the mol fraction of the represented component in the liquid phase.

8. The apparatus of claim 5 including means for measuring the electric current in at least one of said parallel branches, whereupon when the total current is zero the current in said branch represents the difference between the mol fraction of the represented component in the gas phase and in the liquid phase.

9. The apparatus of claim 5 including means for measuring the electric voltage across at least one of said $c_j$ impedances of the first set of branches or one of said $(-c_j-1)$ impedances of the second set of branches, whereupon when the total current is zero the voltage across the $c_j$ impedance of the first set of branches is equal to the mol fraction of the represented component in the liquid phase or the voltage across the $(-c_j-1)$ impedance of the second set of branches is equal to the mol fraction of the represented component in the gas phase.

MORRIS MUSKAT.

REFERENCES CITED

The following references are of record in the file of this patent:

UNITED STATES PATENTS

| Number | Name | Date |
|---|---|---|
| 1,893,009 | Ward | Jan. 3, 1933 |
| 2,403,989 | Mallina | July 16, 1946 |
| 2,416,363 | Wellings | Feb. 25, 1947 |
| 2,417,098 | Wilcox | Mar. 11, 1947 |
| 2,476,747 | Lovell | July 19, 1949 |
| 2,500,997 | Morgan | Mar. 21, 1950 |
| 2,503,387 | Hartwig | Mar. 9, 1950 |
| 2,503,932 | Barbey | Apr. 11, 1950 |
| 2,545,655 | Doyle et al. | Mar. 20, 1951 |